United States Patent
Staring et al.

(10) Patent No.: US 6,865,676 B1
(45) Date of Patent: Mar. 8, 2005

(54) PROTECTING CONTENT FROM ILLICIT REPRODUCTION BY PROOF OF EXISTENCE OF A COMPLETE DATA SET VIA A LINKED LIST

(75) Inventors: Antonius A. M. Staring, Eindhoven (NL); Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/537,079

(22) Filed: Mar. 28, 2000

(51) Int. Cl.[7] .............................................. G06F 11/30
(52) U.S. Cl. ...................... 713/176; 713/181; 713/202; 707/101; 707/202
(58) Field of Search ............................... 713/176, 177, 713/179, 181, 168; 707/101, 202

(56) References Cited

U.S. PATENT DOCUMENTS

| | | | | |
|---|---|---|---|---|
| 5,560,006 | A | * 9/1996 | Layden et al. .................. | 707/2 |
| 5,809,006 | A | 9/1998 | Davis et al. .............. | 369/275.4 |
| 5,893,120 | A | * 4/1999 | Nemes ......................... | 707/206 |
| 5,930,209 | A | 7/1999 | Spitzenberger et al. ....... | 369/32 |
| 6,600,744 | B1 | * 7/2003 | Carr et al. .................... | 370/392 |
| 2001/0054144 | A1 | * 12/2001 | Epstein et al. .............. | 713/161 |
| 2002/0183967 | A1 | * 12/2002 | Epstein ........................ | 702/179 |

FOREIGN PATENT DOCUMENTS

| | | | | |
|---|---|---|---|---|
| EP | 0890948 A1 | 1/1999 | ........... | G11B/20/00 |
| EP | 0903943 A2 | 3/1999 | ............ | H04N/7/26 |
| EP | 0908881 A3 | 4/1999 | ........... | G11B/20/00 |
| EP | 0908881 A2 | 4/1999 | ........... | G11B/20/00 |
| WO | WO9917281 | 4/1999 | ........... | G11B/7/007 |

* cited by examiner

*Primary Examiner*—Norman M. Wright
(74) *Attorney, Agent, or Firm*—Gregory L. Thorne

(57) ABSTRACT

A sufficient number of data items are selected for inclusion in a data set so as to discourage a transmission of the entire set over a limited bandwidth communications path, such as the Internet. Each data item comprises one or more sections, which taken together constitute the complete data set. Each section of the data set is linked to another section of the data set, and each section's link is bound to the section via the use of one or more watermarks. Upon presentation of material for rendering, the presence of the entirety of the data set is verified by ascertaining the presence of linked-to sections. For further security, the links between sections is formed by a random selection of each linked-to section. To verify that each linked-to section corresponds to the original section that was linked-to, each link contains an identifier of the linked-to section that can be used to determine that a retrieval of a linked-to section corresponds to the originally assigned linked-to section. If the identifier associated with the linked-to section does not properly match the presented linked-to section, a rendering of the data items of the data set is prevented. In a preferred embodiment, a closed linked list is formed, so that every section of the data set can be included in the verification process, if desired.

44 Claims, 5 Drawing Sheets

PROTECTING CONTENT FROM ILLICIT REPRODUCTION BY PROOF OF EXISTENCE OF A COMPLETE DATA SET VIA A LINKED LIST

BACKGROUND OF THE INVENTION

1. Field of the Invention

This invention relates primarily to the field of consumer electronics, and in particular to the protection of copy-protected content material.

2. Description of Related Art

The illicit distribution of copyright material deprives the holder of the copyright legitimate royalties for this material, and could provide the supplier of this illicitly distributed material with gains that encourage continued illicit distributions. In light of the ease of information transfer provided by the Internet, content material that is intended to be copy-protected, such as artistic renderings or other material having limited distribution rights, are susceptible to wide-scale illicit distribution. The MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, a malicious party could read songs from an original and legitimate CD, encode the songs into MP3 format, and place the MP3 encoded song on the Internet for wide-scale illegitimate distribution. Alternatively, the malicious party could provide a direct dial-in service for downloading the MP3 encoded song. The illicit copy of the MP3 encoded song can be subsequently rendered by software or hardware devices, or can be decompressed and stored onto a recordable CD for playback on a conventional CD player.

A number of schemes have been proposed for limiting the reproduction of copy-protected content material. The Secure Digital Music Initiative (SDMI) and others advocate the use of "digital watermarks" to identify authorized content material. EP 0981901 "Embedding auxiliary data in a signal" issued 1 Mar. 2000 to Antonius A. C. M. Kalker, discloses a technique for watermarking electronic material, and is incorporated by reference herein. As in its paper watermark counterpart, a digital watermark is embedded in the content material so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark. Because some content material may not be copy-protected and hence may not contain a watermark, the absence of a watermark cannot be used to distinguish legitimate from illegitimate material. On the contrary, the absence of a watermark is indicative of content material that can be legitimately copied freely.

Other copy protection schemes are also available. For example, European patent EP0906700, "Method and system for transferring content, information and supplemental information related thereto", issued 7 Apr. 1999 to Johan P. M. G., presents a technique for the protection of copyright material via the use of a watermark "ticket" that controls the number of times the protected material may be rendered, and is incorporated by reference herein.

An accurate reproduction of watermarked material will cause the watermark to be reproduced in the copy of the watermarked material. An inaccurate, or lossy reproduction of watermarked material, however, may not provide a reproduction of the watermark in the lossy copy of the material. A number of protection schemes, including those of the SDMI, have taken advantage of this characteristic of lossy reproduction to distinguish legitimate material from illegitimate material, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content material, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content material is copy protected, and the absence or corruption of a corresponding fragile watermark when a robust watermark is present indicates that the copy protected material has been tampered with in some manner. An SDMI compliant device is configured to refuse to render watermarked material with a corrupted watermark, or with a detected robust watermark but an absent fragile watermark, except if the corruption or absence of the watermark is justified by an "SDMI-certified" process, such as an SDMI compression of copy protected material for use on a portable player. For ease of reference and understanding, the term "render" is used herein to include any processing or transferring of the content material, such as playing, recording, converting, validating, storing, loading, and the like. This scheme serves to limit the distribution of content material via MP3 or other compression techniques, but does not affect the distribution of counterfeit unaltered (uncompressed) reproductions of content material. This limited protection is deemed commercially viable, because the cost and inconvenience of downloading an extremely large file to obtain a song will tend to discourage the theft of uncompressed content material.

BRIEF SUMMARY OF THE INVENTION

It is an object of this invention to extend the protection of copy-protected material to include the protection of uncompressed content material.

This object and others are achieved by selecting a sufficient number of data items for inclusion in a data set so as to discourage a transmission of the entire set over a limited bandwidth communications path, such as the Internet. Each data item comprises one or more sections, the totality of all sections comprising the complete data set. Each section of the data set is linked to another section of the data set, and each section's link is bound to the section via the use of one or more watermarks. Upon presentation of material for rendering, the presence of the entirety of the data set is verified by ascertaining the presence of linked-to sections. For further security, the link between sections is formed by a random selection of each linked-to section. To verify that each linked-to section corresponds to the original section that was linked-to, each link contains an identifier of the linked-to section that can be used to determine that a retrieval of a linked-to section corresponds to the originally assigned linked-to section. If the identifier associated with the linked-to section does not properly match the presented linked-to section, a rendering of the data items of the data set is prevented. In a preferred embodiment, a closed linked list is formed, so that every section of the data set can be included in the verification process, if desired.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
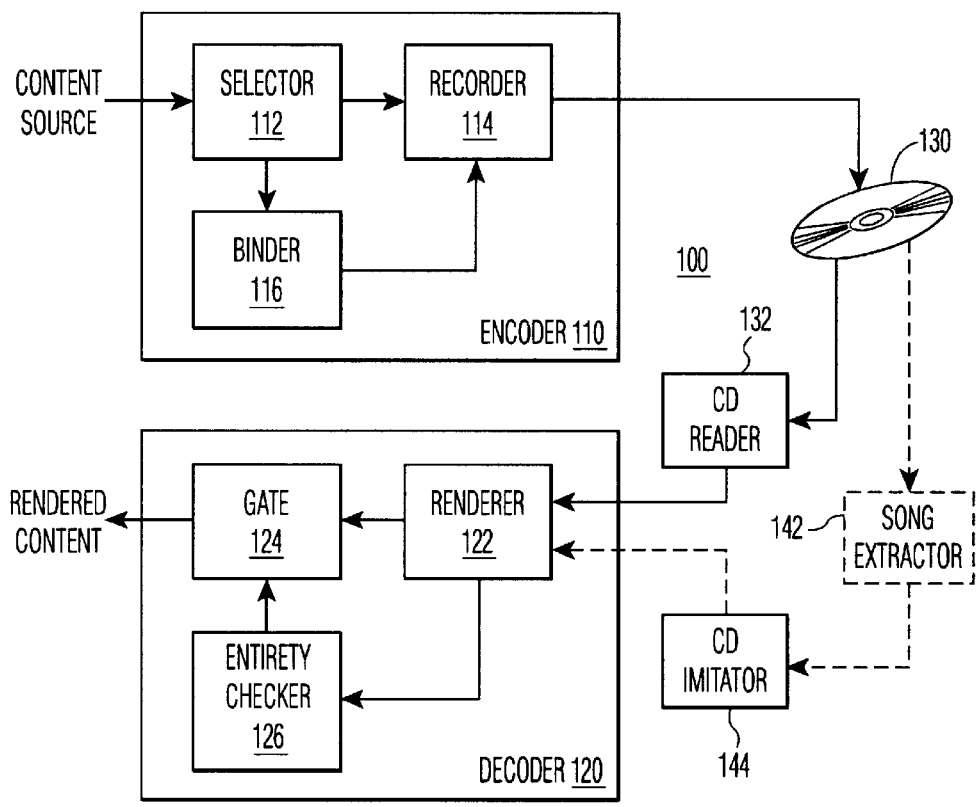
FIG. 1 illustrates an example system for protecting copy-protected content material in accordance with this invention.

For ease of understanding, the invention is presented herein in the context of digitally recorded songs. As will be evident to one of ordinary skill in the art, the invention is applicable to any recorded information that is expected to be transmitted via a limited bandwidth communications path. For example, the individual content material items may be data records in a larger database, rather than songs of an album.

The theft of an item can be discouraged by making the theft more time consuming or inconvenient than the worth of the stolen item. For example, a bolted-down safe is often used to protect small valuables, because the effort required to steal the safe will typically exceed the gain that can be expected by stealing the safe. Copending U.S. patent application "Protecting Content from Illicit Reproduction by Proof of Existence of a Complete Data Set", U.S. Ser. No. 09/536,944, filed Mar. 28, 2000, for Michael Epstein, (disclosure 709999B), teaches selecting and binding of data items to a data set that is sized sufficiently large so as to discourage a transmission of the data set via a bandwidth limited communications system, such as the Internet, and is incorporated by reference herein. This copending application teaches a binding of the data items in the data set by creating a watermark that contains a data-set-entirety parameter and embedding this watermark into each section of each data item. The copending application also teaches including a section-specific parameter (a random number assigned to each section) in the watermark.

The referenced copending application teaches the use of "out of band data" to contain the entirety parameter, or information that can be used to determine the entirety parameter. The section watermarks are compared to this entirety parameter to assure that they are the same sections that were used to create the data set and this entirety parameter. To minimize the likelihood of forgery, the entirety parameter is based on a hash of a composite of section-specific identifiers. The referenced copending application also teaches the use of digitally signed certificates and other techniques that rely on cryptographic techniques, such as hashing and the like.

In accordance with the invention herein, a self-referential data set is used that facilitates the determination of whether the entirety of the data set is present, without the use of out of band data and without the use of cryptographic functions, such as a hash function. If the entirety of the data set is not present, subsequent processing of the data items of the data set is terminated. In the context of digital audio recordings, a compliant playback or recording device is configured to refuse to render an individual song in the absence of the entire contents of the CD. The time required to download an entire album on a CD in uncompressed digital form, even at DSL and cable modem speeds, can be expected to be greater than an hour, depending upon network loading and other factors. Thus, by requiring that the entire contents of the CD be present in uncompressed form, at a download "cost" of over an hour, the likelihood of a theft of a song via a wide-scale distribution on the Internet is substantially reduced.

FIG. 1 illustrates an example block diagram of a protection system 100 in accordance with this invention. The protection system 100 comprises an encoder 110 that encodes content material onto a medium 130, and a decoder 120 that renders the content material from the medium 130. The encoder 110 includes a selector 112 that selects content material from a source, a binder 116 that builds an entirety verification structure, and a recorder 114 that records the content material onto the medium 130. The selector 112, for example, may be configured to select content material corresponding to songs that are being compiled into an album. For ease of reference, each selected content material item is termed a "data item", and the entirety of the data items forms a "data set". Each data item comprises one or more sections of data that form the data item, the totality of sections also forming the "data set". The binder 116 creates a data structure consisting of links between sections of the data set, by means of which the entirety of the data set can be verified. Preferably, each section's link is bound to the section via the use of one or more watermarks. The recorder 114 appropriately formats, encodes, and stores the data set, with the aforementioned data structure, on the medium 130, using techniques common in the art.

In accordance with this invention, the selector 112 selects data items to be added to the data set until the size of the data set is deemed large enough to discourage a subsequent transmission of the data set via a limited bandwidth communications channel. This "discouraging size" is a subjective value, and will depend upon the assumed available communications bandwidth, the loss incurred by the transmission, and so on. Other criteria may also be used to determine whether to add additional data items to the data set. For example, if the data items correspond to songs of an existing album collection, all of the songs will typically be added to the data set, regardless of whether the size of the data set has exceeded the determined discouraging size. If all of the songs of the album collection have been selected, and the discouraging size criterion has not yet been reached, other data items are selected to accumulate the required discouraging size. For example, data items comprising random data bits may be added to the data set to increase its size. These random bits will typically be stored as out of band data, CD-ROM data, and the like, to prevent it from being rendered as audible sounds by a conventional CD player. Alternatively, the data items may comprise other sample songs that are provided to encourage the sale of other albums, or images and video sections related to the recorded content material. Similarly, promotional material, such as Internet access subscription programs may also be included in the recorded information on the recorded medium. These and other means of adding size to a data set will be evident to, one of ordinary skill in the art in view of this invention.

The decoder 120 in accordance with this invention comprises a renderer 122 and a gate 124 that is controlled by an entirety checker 126. The renderer 122 is configured to retrieve information from a medium reading device, such as a CD reader 132. As is common in the art, the renderer 122 retrieves the information by specifying a location index, and in response, the reader 132 provides the data located at the specified location index on the medium 130. Block reads of data at contiguous locations on the medium 130 are effected by specifying a location index and a block size.

The dotted lines of FIG. 1 illustrate an example song extractor 142 that extracts a song from the medium 130 and communicates it to an example CD imitator 144, representative of a possible illicit download of the song via the Internet. The CD imitator 144 represents, for example, a software program that provides information in response to a conventional CD-read command. Alternatively, the information received from the song extractor can be written to a CD medium, and provided to the conventional CD reader 132. As noted above, the song extractor 142 is likely to be used because the transmission of the entirety of the contents of the medium 130 is assumed to be discouraged by the purposefully large size of the contents of the medium 130.

Figure 2:
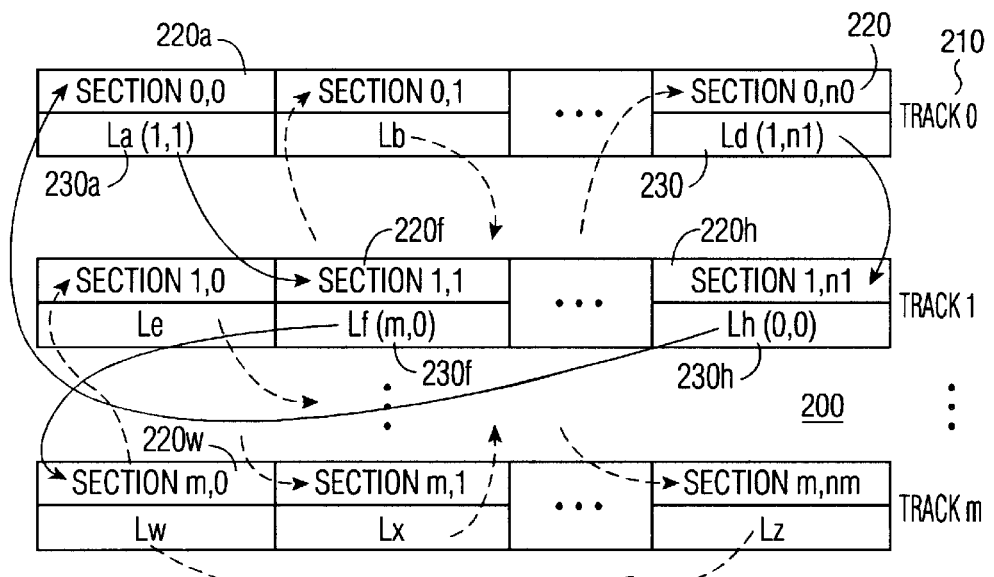
FIG. 2 illustrates an example data structure that facilitates a determination of the presence of an entirety of a data set in accordance with this invention.

In accordance with this invention, the entirety checker 126 is configured to obtain data from the medium 130, typically via the renderer 122, to determine whether the entire data set is present. FIG. 2 illustrates an example data structure 200 for storing data items in a data set that facilitates a determination of whether the entirety of the original data set is present. A track T 210 and section S 220 structure is illustrated, consistent with the memory structure of conventional CD and other storage media. As illustrated, each track T 210 may have a different number of sections S 220. In the example data structure 200, each section S 220 contains a link 230 to another section S in the data structure 200. In a preferred embodiment, the link 230 of each section 220 is based on a random selection of available other links. For example the first section (0,0) at Track 0, Section 0 220*a* has an associated link La 230*a* that "links to" section (1,1) at Track 1, Section 1 220*f* This section 220*f* has an associated link Lf 230*f* that links to section (m,0) at Track m, Section 0 220*w*. In a preferred embodiment, the links form a closed linked list, such that a traversal through the data set from link to link forms a closed loop. The first section that receives a random linked-to section (in this example, section (0,0) 220*a*) is held in reserve as the random selection process progresses through the data set, via each linked-to section, and assigns a randomly selected available section to each linked-to section. When all of the sections have been assigned as linked-to sections, the first section is assigned as the last section's linked-to section. For example, the section (1,n1) 220*h* in the example data structure 200 of FIG. 2 represents the last linked-to section of the data set 200, and its linked-to section Lh 230*h* is the first section (0,0) 220*a*, thereby forming a closed linked list of all of the sections 220 of the data set 200. The entirety of the data set 200 is verified by progressing through the data set 200 via the links L 230 and verifying that each linked-to section is present. By providing a random linked list, the difficulty of creating a forged foreshortened list containing a complete song is increased. To prevent a substitution of link assignments, the link L 230 of each section 220 is preferably encoded as a mix of robust and fragile watermarks, for example, the linked-to track number may be encoded as a robust watermark, and the linked-to section number within that track may be encoded as a fragile watermark. As noted above, a robust watermark is one whose removal causes substantial damage or corruption of the data in which it is embedded, and a fragile watermark is one which incurs damage or corruption if the data in which it is embedded is modified or deleted, such as by compression.

Figure 3:
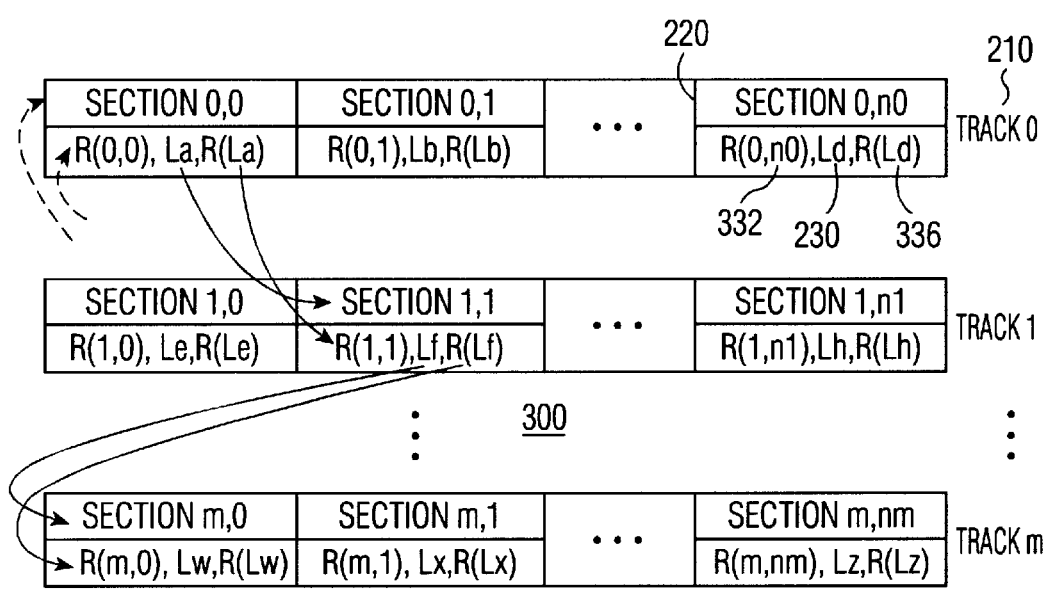
FIG. 3 illustrates an example alternative data structure that facilitates a determination of the presence of an entirety of a data set, and a verification of sections in the data set, in accordance this invention.

FIG. 3 illustrates an example alternative data structure 300 that facilitates a further verification that the linked list, and each linked-to section, has not been modified or replaced. In the data structure 300, a random number R(T,S) 332 is assigned to each section S 220 of each track T 210, as in the referenced copending application, and the random number of each section's linked-to section R(L) 336 is also assigned to each section S 220. As the random closed linked list is traversed, via the links 230 associated with the sections 220, the assigned linked-to section's random number R(L) 336 is compared to the random number R(T,S) 332 at the linked-to section. These random numbers are also encoded as a watermark that is embedded in the section 220. Preferably, these numbers are encoded as a fragile watermark, because a fragile watermark consumes less resources than a robust watermark, and a fragile watermark is sensitive to a modification, such as a compression, of the section data in which it is embedded. Other arrangements of robust and fragile watermarks will be evident to one of ordinary skill in the art in view of this invention. Similarly, other methods of creating the identifiers in each section can be used, such as putting a number in one section, and a function value of that number in its linked-to section.

Figure 4:
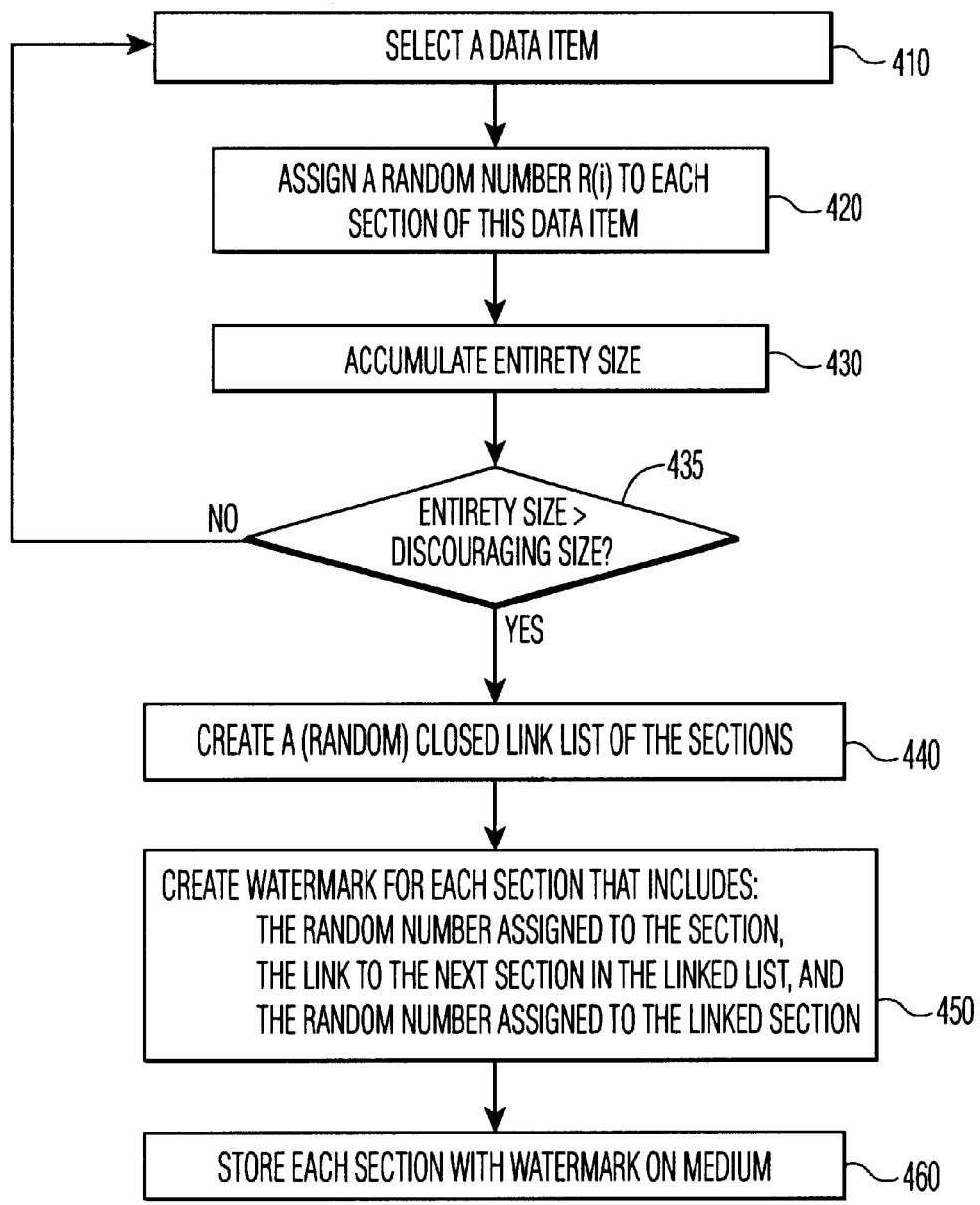
FIG. 4 illustrates an example flow diagram of an encoding system that creates a data set that has a data structure that facilitates a determination of the presence of an entirety of the data set in accordance with this invention.

FIG. 4 illustrates an example flow diagram for creating the example data structure 300 of FIG. 3. The loop 410–435 accumulates data items to form a data set that is sufficient large so as to discourage a transmission of the data set via a limited bandwidth communications channel, such as a download from the Internet. As each data item is selected, at 410, each section comprising the data item is assigned a random number that is used to identify the section, at 420, and its size is added to the accumulated size of the data set, at 430. After accumulating a sufficiently sized data set, at 435, a random closed linked list of the sections of the data set is created, at 440, as discussed above. At 450, one or more watermarks are created for each section, comprising the random number assigned to the section, the linked-to section, and the random number assigned to the linked-to section. As noted above, a combination of robust and fragile watermarks are preferably used for encoding the information associated with each section. The section and its embedded watermark(s) are recorded onto the recording medium, such as a CD, at 460.

Figure 5:
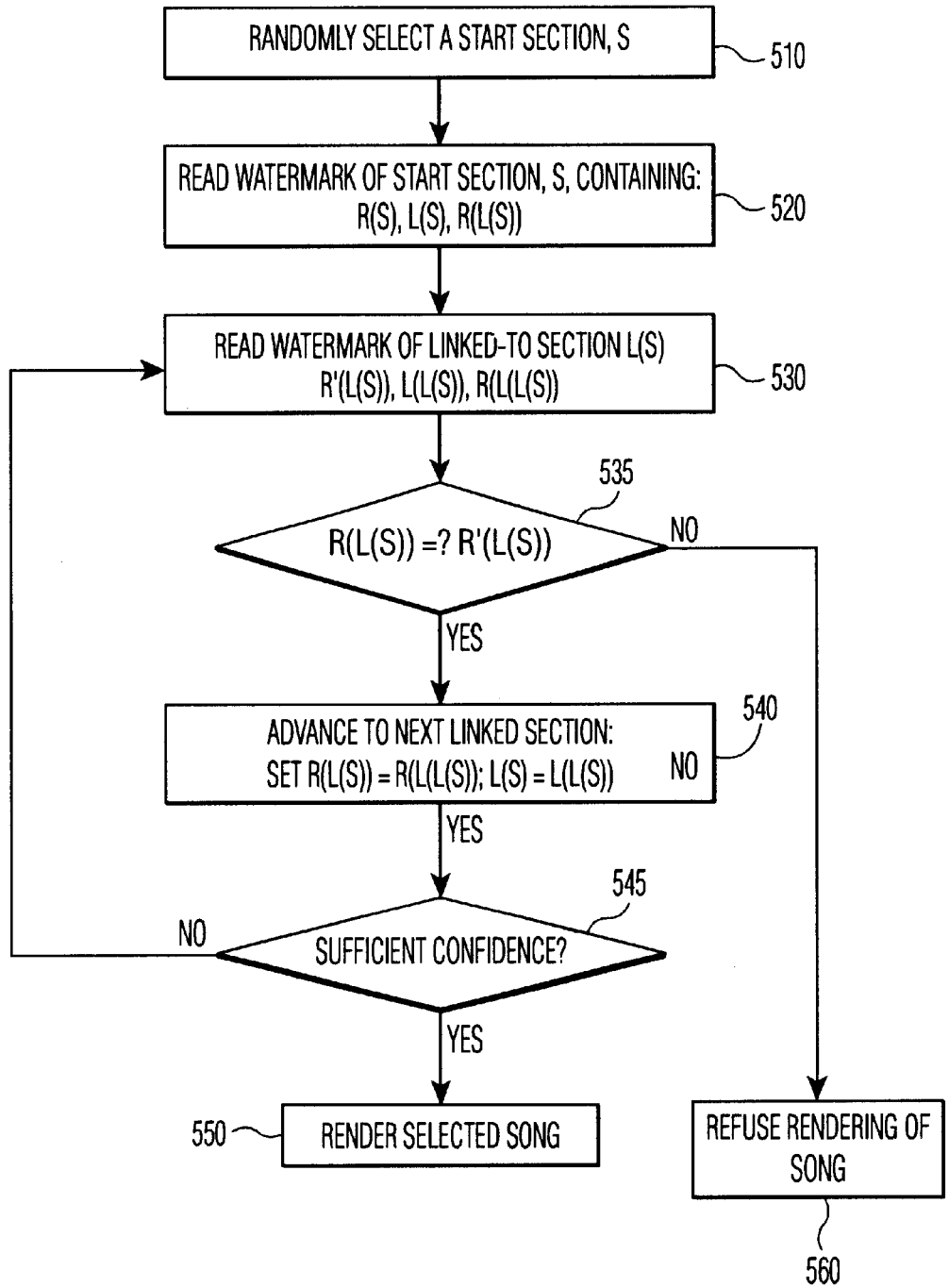
FIG. 5 illustrates an example flow diagram of a decoding system for rendering content material in dependence upon the presence of an entirety of a data set in accordance with this invention.

FIG. 5 illustrates an example flow diagram of the rendering of data items of a data set in dependence upon the presence of the entirety of the data set, using the example data structure 300 of FIG. 3 to determine the presence of the entirety of the data set. It is assumed that the rendering device has detected the presence of copy-protected material, via for example, the detection of a watermark or other marking of the material. At 510, a starting section S is selected, preferably at random. The watermark of the starting section S is read, at 520. The watermark includes a link address that specifies the track and section number of another section, and a random number that is associated with the section at the link address. At 530, the watermark of the linked-to section is read, at 530. This watermark includes the random number assigned to the linked-to section, as well as its link address and associated random number. The random number associated with the linked-to section that is contained in the start section is compared with the random number contained in the linked-to section, at 535. If the random numbers are not equal, subsequent processing of data items in the data set, such as the rendering of a song, is terminated, at 560. As noted above, other linked-identifier techniques may also be used, such as storing a random number in one section, and a function, such as a hash, of this number in the linked-to section. If an alternative encoding scheme is used, the comparison at 535 is modified accordingly.

If the section-identifiers are found to be equivalent, at 535, the process continues, at 540, by advancing to the linked-to section. The above section-identifier matching is continued for each subsequent linked-to section, via the loop to 530, until sufficient confidence is gained that the entirety of the data set is present, at 545. In this embodiment, absolute confidence can be gained by continuing the loop 530–545 until the linked-to section becomes the original start section, indicating that all links in the closed linked list have been processed. The reading of each watermark, however, is time consuming, and a substantial delay before the rendering of a song may be unacceptable to consumers. In a preferred embodiment, the rendering of the song begins immediately after a few successful random number matches. Thereafter, if the rendering system is able to read information from the medium faster than is required for rendering the material, additional linked-to section watermarks are read and verified, and the rendering is terminated if and when a mis-match is found.

Figure 6:
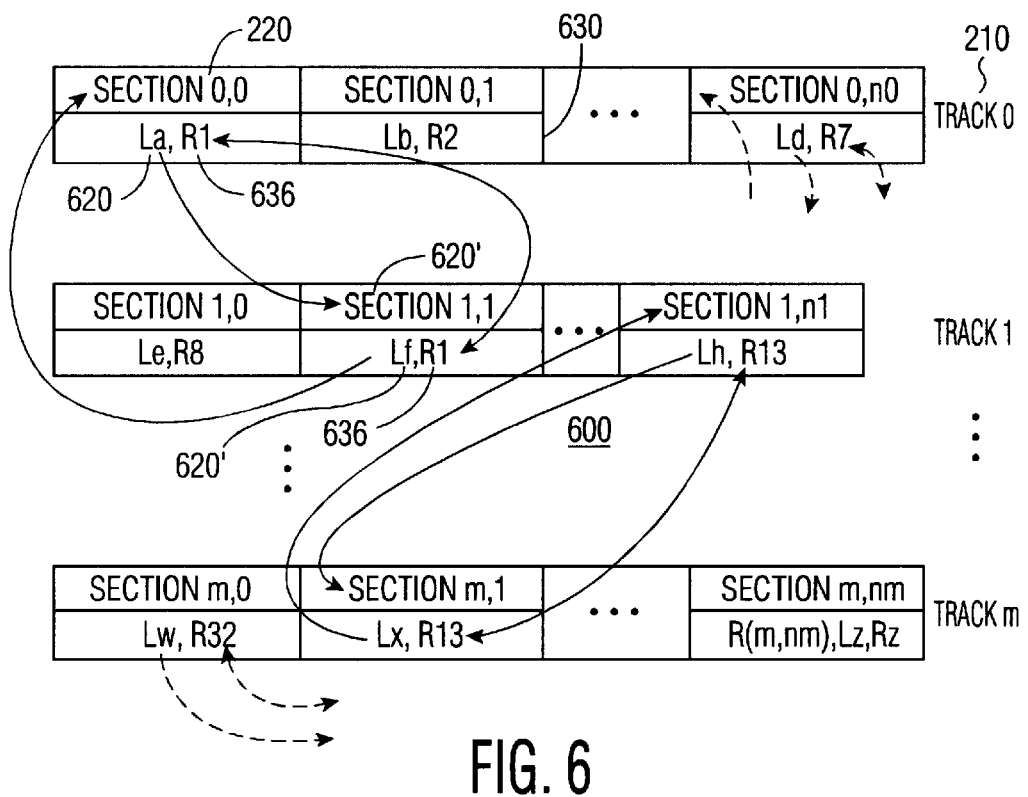
FIG. 6 illustrates an example alternative data structure that facilitates a determination, based on a statistical degree of certainty, that the entirety of the data set is present, in accordance with this invention.

Other data structures and corresponding encoding and decoding processes will be evident to one of ordinary skill in the art in view of this invention. FIG. 6 illustrates an alternative data structure 600 that uses randomly linked pairs of sections to verify the presence of an entirety of the data set. In FIG. 6, each section 620 has an associated linked-to section L 634 and an associated random number R 636. In this example alternative embodiment, the linked-to section 620' has a linked-to section L 634' that points back to the linked-from section 620. That is, the linked-to addresses L 634, 634' form a linked pair of sections 620, 620'. In this data structure, a common random number R 636 is assigned to each section of the linked pair of sections 620, 620'. To determine whether an entirety of the data set is present, randomly selected sections are tested by verifying that each section's random number is equal to the random number at its linked-to section. It is assumed herein that the range, or approximate range, of the section addresses can be determined, so that the first "randomly selected section" is a viable section on the recorded medium. For example, the table of contents of the medium may be used to determine the viable track addresses, assuming that the table of contents has an embedded fragile watermark, or other security device, that can be used to determine the validity of the table of contents. If a range cannot-be determined, the first randomly selected section will be from the track selected for rendering. In this manner, if a malicious party uses a song extractor 142 (FIG. 1) to "rip" a song from a CD, and communicates it, in compressed or uncompressed form, via the Internet, a verification of the links will result in a "track-section not found" response from the CD reader 132 or CD imitator 144 for any link in the sections of the song that link-to a section of another song in the original data set. If the CD imitator 144 substitutes a bogus section in response to this verification request, the bogus section will not contain the appropriate random number watermark, and the entirety checker 126 will preclude further renderings of the ripped song.

Regardless of whether the selected song is used to generate the first section for verification, absolute certainty that all sections are present can be achieved by maintaining a list of tested sections, and verification continued until all section-pairs are tested. This approach assumes that the range of the section addresses can be determined or estimated, so that a truncation of the data set can be detected. In the case of the selected song being used to initiate the verification, the range of the section addresses can be assumed to be continuous through the range of link addresses in the selected song. For example, if one of the link addresses is track 10, section 9, a verification of each section 0 through 9 of track 10 can be made, and a verification of section 0 of tracks 0 through 10 can be made. These and other techniques for filling in a search area will be evident to one of ordinary skill in the art in view of this disclosure.

In a preferred embodiment, to minimize the time required to effect the determination that the entirety of the data set is present, random section pairs are tested until sufficient confidence is gained to justify the determination, with substantial statistical certainty. That is, for example, if only half the data set is actually present, the random selection of the first section, from within the total range of all sections, is likely to detect an absence of this section 50% of the time; if this section is present, the likelihood of its linked-to section being present is 50%. Thus, a successful pair-test provides 75% confidence that at least half the data set is present. Each successive test increases either the confidence level or the expected proportion of the data set being present, or both. Statistical tests are commonly available for determining an appropriate number of pair-test to achieve a desired level of confidence that a given proportion of the data set is present. In a typical embodiment, the verification of at least five randomly selected pairs is considered sufficient to determine the presence or absence of the entirety of the data set.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the examples presented above illustrate each part of the recorded material being part of the data set. In an alternative embodiment, select data items, or select parts of data items, may be used to form the data set, for efficiency purposes. For example, the tail end of songs may not be part of the "data set" as defined herein, because the watermark process may be based on a fixed block-size for each watermark, or each redundant copy of the watermark. If, for example, the watermark, or other parameter, requires ten seconds of a recording for a reliable embedding, the remainder of ((the song's length) modulo (10 seconds)) will be recorded on the medium, but not included in the "data set" whose entirety is being checked. In like manner, some promotional material may be included on the recorded medium, but purposely excluded from the data set, so that it may be freely copied and rendered elsewhere. Note also that the example flow diagrams are presented for ease of understanding, and the particular arrangement and sequence of steps are presented for illustration. For example, simple equalities are illustrated in the decision blocks for determining correspondence, whereas depending upon the particular techniques used to encode or decode the parameters, the assessment as to whether the read item corresponds to a determined item can include a variety of intermediate processes. These processes may include, for example, a decryption of items based on particular keys, fuzzy logic or statistical testing to determine if two values are "close enough" to imply a correspondence, and the like. Variations such as these and others will be evident to one of ordinary skill in the art in view of this invention, and are included in the spirit and scope of the following claims.

We claim:

1. A method for discouraging a theft of content material comprising:
   collecting a plurality of data items comprising the content material to form a data set that is sized to be sufficiently large so as to discourage a subsequent transmission of the data set via a limited bandwidth communications channel,
      each data item of the data items including one or more sections, thereby forming a plurality of sections comprising the data set,
   assigning a link address to each section of the plurality of sections, the link address being associated with an other section of the plurality of sections, to facilitate a subsequent detection of an absence of an entirety of the data set based on an absence of a linked-to section that corresponds to the link address of one or more select sections of the plurality of sections.

2. The method of claim 1, further including:
   encoding the link address of each section as one or more watermarks that are embedded in the section.

3. The method of claim 1, wherein
   the one or more watermarks include:
      a robust watermark that is configured such that a removal of the robust watermark causes a corruption of data contained in the section, and
      a fragile watermark that is configured such that a modification of the data contained in the section causes a corruption of the fragile watermark.

4. The method of claim 3, wherein the plurality of data items includes a plurality of at least one of: digitally encoded audio content, and digitally encoded video content.

5. The method of claim 3, wherein assigning the link address to each section includes
   creating a closed linked list that links the entirety of the sections via the link address of each section.

6. The method of claim 1, further including:
   assigning a verification parameter to each section of the plurality of sections, to facilitate a subsequent verification that each section corresponding to each link address is a valid section.

7. The method of claim 6, further including:
   encoding the link address of each section and the verification parameter as one or more watermarks that are embedded in the section.

8. The method of claim 7, wherein
   the one or more watermarks include:
      a robust watermark that is configured such that a removal of the robust watermark causes a corruption of data contained in the section, and
      a fragile watermark that is configured such that a modification of the data contained in the section causes a corruption of the fragile watermark.

9. The method of claim 8, wherein the plurality of data items includes a plurality of at least one of: digitally encoded audio content, and digitally encoded video content.

10. The method of claim 8, wherein assigning the link address to each section includes
    creating a closed linked list that links the entirety of the sections via the link address of each section.

11. The method of claim 10, wherein creating the closed linked list includes a random selection.

12. The method of claim 1, wherein assigning the link address to each section includes
    creating a closed linked list that links the entirety of the sections via the link address of each section.

13. The method of claim 12, wherein creating the closed linked list includes a random selection.

14. The method of claim 1, wherein assigning the link address to each section includes
    selecting a random other section to link to the section via the link address.

15. A method of decoding content material from a source comprising:
    reading one or more first entirety parameters associated with a first section of a data set,
       the one or more first entirety parameters comprising a link address to a second section of the data set,
    reading one or more second entirety parameters associated with the second section of the data set, and
    decoding subsequent sections of the data set in dependence upon the reading of the one or more second entirety parameters.

16. The method of claim 15, wherein
    the one or more second entirety parameters include a section verification parameter, and
    the decoding of the subsequent sections is dependent upon the section verification parameter.

17. The method of claim 16, wherein
    the section verification parameter comprises a random number that is associated with the second section when the data set is created.

18. The method of claim 15, further including
    reading subsequent entirety parameters associated with other sections of the data set, based on the reading of the second entirety parameters,
    wherein
    the decoding of subsequent sections of the data set is in further dependence upon the reading of the subsequent entirety parameters.

19. The method of claim 18, further including
    determining when the reading of the subsequent entirety parameters includes a completion of reading of all sections of the data set.

20. The method of claim 15, further including
    rendering content material corresponding to the subsequent sections of the data set.

21. The method of claim 15, wherein
    the one or more second entirety parameters are embedded in the second section as one or more watermarks.

22. The method of claim 21, wherein
    the one or more watermarks include:
       a robust watermark that is configured such that a removal of the robust watermark causes a corruption of data contained in the second section, and
       a fragile watermark that is configured such that a modification of the data contained in the second section causes a corruption of the fragile watermark.

23. A storage medium that is configured to contain content material, the storage medium comprising
a data structure that includes:
a plurality of sections, and
one or more entirety parameters corresponding to each section of the plurality of sections,
wherein
the one or more entirety parameters include a link address that links the corresponding section to an other section of the plurality of sections to facilitate a determination of whether an entirety of the plurality of sections is present on a subsequent copy of at least a portion of the plurality of sections.

24. The storage medium of claim 23, wherein
the other section data is linked to the corresponding section data via a random selection of the link address for each entirety parameter.

25. The storage medium of claim 23, wherein
the plurality of sections includes a collection of at least one of: digitally encoded audio content, and digitally encoded video content.

26. The storage medium of claim 23, wherein
at least one of the one or more entirety parameters is embedded in each section of the plurality of sections as one or more watermarks.

27. The storage medium of claim 26, wherein
the one or more watermarks include:
a robust watermark that is configured such that a removal of the robust watermark causes a corruption of data comprising the section, and
a fragile watermark that is configured such that a modification of data comprising the section causes a corruption of the fragile watermark.

28. An encoder comprising:
a selector that is configured to select data items comprising a data set so that an accumulated size of the data set is sufficient to discourage a transmission of the data set via a limited bandwidth communications channel,
each data item of the data items comprising one or more sections,
a binder that is configured to associate a link address to each section of the data items comprising the data set, the link address corresponding to an other section of the data items comprising the data set, and
a recorder that is configured to record each section and each associated link address to a medium to facilitate a subsequent rendering of the data items in dependence upon a presence of one or more of the other sections of the data items corresponding to the link address of one or more sections of the data set.

29. The encoder of claim 28, wherein
the binder is further configured to associate the link address to each section via a random process.

30. The encoder of claim 29, wherein
the recorder stores each link address as one or more watermarks that are embedded in the associated section.

31. The encoder of claim 30, wherein
the one or more watermarks include:
a robust watermark that is configured such that a removal of the robust watermark causes a corruption of data contained in the section, and
a fragile watermark that is configured such that a modification of the data contained in the section causes a corruption of the fragile watermark.

32. The encoder of claim 31, wherein
the binder is further configured to associate a section verification parameter to each section, and
the recorder is further configured to record the section verification parameter with each section to facilitate a verification that the section is present in the subsequent rendering of the data items.

33. The encoder of claim 32, wherein
the binder associates the section verification parameter to each section based on a random process.

34. The encoder of claim 32, wherein
the recorder stores each verification parameter and each link address as one or more watermarks that are embedded in the associated section.

35. The encoder of claim 34, wherein
the one or more watermarks include:
a robust watermark that is configured such that a removal of the robust watermark causes a corruption of data contained in the section, and
a fragile watermark that is configured such that a modification of the data contained in the section causes a corruption of the fragile watermark.

36. The encoder of claim 28, wherein the data items includes a plurality of at least one of: digitally encoded audio content, and digitally encoded video content.

37. A decoder comprising:
a renderer that is configured to receive data items corresponding to a data set, and to produce therefrom a rendering corresponding to a select data item,
each data item of the data items including one or more sections, thereby forming a plurality of sections comprising the data set,
each section of the plurality of sections including a link address corresponding to an other section of the data set, and
an entirety checker, operably coupled to the renderer, that is configured to preclude the rendering corresponding to the select data item in dependence upon a presence of one or more of the other sections corresponding to the link address of one or more sections of the plurality of sections.

38. The decoder of claim 37, wherein
the entirety checker is further configured to determine the presence of all other sections corresponding to the link address of all sections of the plurality of sections.

39. The decoder of claim 37, wherein
the link address of each section is included in one or more watermarks that are associated with the section.

40. The decoder of claim 39, wherein
the one or more watermarks include:
a robust watermark that is configured such that a removal of the robust watermark causes a corruption of data contained in the section, and
a fragile watermark that is configured such that a modification of the data contained in the section causes a corruption of the fragile watermark.

41. The decoder of claim 37, wherein
the entirety checker is further configured to verify the presence of the one or more other sections based on a verification parameter that is associated with each section.

42. The decoder of claim 41, wherein
the verification parameter and the link address of each section are included as one or more watermarks that are embedded in the associated section.

43. The decoder of claim 42, wherein the one or more watermarks include:
- a robust watermark that is configured such that a removal of the robust watermark causes a corruption of data contained in the section, and
- a fragile watermark that is configured such that a modification of the data contained in the section causes a corruption of the fragile watermark.

44. The decoder of claim 37, wherein the data items correspond to at least one of digitally encoded audio content, and digitally encoded video content.

* * * * *